JAMES T. WILSON, OF BROOKLYN, NEW YORK.

Letters Patent No. 72,143, dated December 10, 1867.

---

IMPROVED MEDICAL COMPOUND.

---

*The Schedule referred to in these Letters Patent and making part of the same.*

---

TO ALL WHOM IT MAY CONCERN:

Be it known that I, JAMES T. WILSON, of Brooklyn, in the county of Kings, and State of New York, have invented a new and improved Compound for the Purpose of Curing and Preventing Fever and Ague; and I do hereby declare that the following is a full and exact description thereof.

The nature of my invention consists in compounding and combining certain ingredients in certain definite proportions, so that when administered to a person suffering under the disease known as fever and ague, according to the directions hereinafter described, a complete and perfect cure will be effected.

To enable others skilled in the art to make and use my invention, I will proceed to describe the ingredients used, and the combination made therefrom.

I take three gills best Holland gin, and reduce it to one-half its bulk by evaporation; then add seven ounces tincture capsicum, one drachm tincture peppermint, one-half drachm tincture opium, and thoroughly mix them together, when the compound is ready for use.

The dose to be given to a person affected with or threatened with the ague is, one tablespoonful three times a day, one hour after eating.

Having thus described my invention, what I claim, and desire to secure by Letters Patent, is—

The combination of the above-named ingredients in the manner as and for the purpose described.

JAMES T. WILSON.

Witnesses:
WM. CLARK,
J. H. HERRON.